Figure 1:
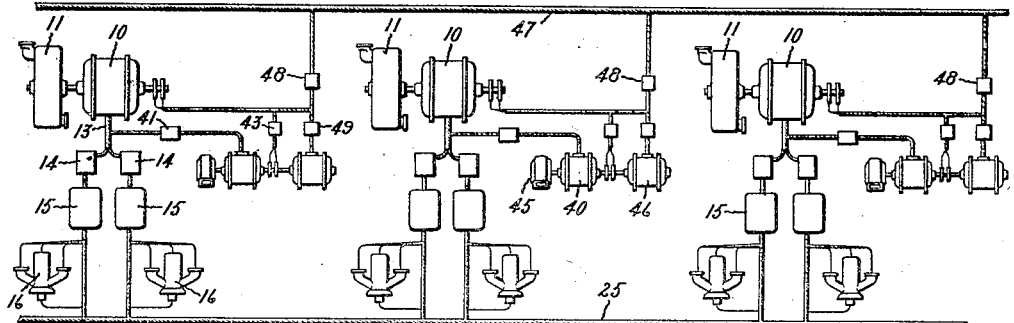

H. M. HOBART.
ELECTRICAL SYSTEM OF SHIP PROPULSION.
APPLICATION FILED SEPT. 1, 1915.

1,262,497. Patented Apr. 9, 1918.

Inventor:
Henry M. Hobart,
by
His Attorney.

UNITED STATES PATENT OFFICE.

HENRY M. HOBART, OF SCHENECTADY, NEW YORK, ASSIGNOR TO GENERAL ELECTRIC COMPANY, A CORPORATION OF NEW YORK.

ELECTRICAL SYSTEM OF SHIP PROPULSION.

1,262,497.

Specification of Letters Patent.

Patented Apr. 9, 1918.

Application filed September 1, 1915. Serial No. 48,456.

*To all whom it may concern:*

Be it known that I, HENRY M. HOBART, a citizen of the United States, residing at Schenectady, in the county of Schenectady, State of New York, have invented certain new and useful Improvements in Electrical Systems of Ship Propulsion, of which the following is a specification.

My invention relates to electrical systems of ship propulsion. The object of the invention is to provide an improved system of electrical apparatus for the propulsion of ships, and particularly to provide an electrical system of ship propulsion whose first cost is reasonable and whose operative economy is good. Other objects of my invention will be brought out in the course of the following description.

The first suggestion of the use of electrical apparatus for the propulsion of ships, as far as I am aware, was made about twenty years ago by J. J. Heilmann. See United States Patent #602,325, April 12, 1898. Heilmann proposed the use of a direct current generator driven by a steam engine and delivering energy to propeller-driving direct current electric motors. In 1908 two electrically propelled fire-boats were placed in service by the city of Chicago. These fire-boats were propelled by twin screws independently driven by direct current electric motors which derived energy from direct current generators mounted on the shafts of steam turbines. A description of the electrical propelling equipment of these fire-boats will be found in the *Electrical Review and Western Electrician* of January 2, 1909, page 27. In 1913, the United States collier *Jupiter* was equipped with electrical propelling apparatus comprising turbo-alternators and propeller-driving induction motors having form-wound secondaries adapted to be connected to large water-cooled rheostats. The *Jupiter* installation is described in the *Journal of the American Society of Naval Engineers*, November, 1913, pages 558–9, and May, 1914, pages 339–41. These two equipments, representing the best known examples of the practical and successful application of electric propulsion to ships of considerable size, are distinctly different in character, in that one is an entirely direct current installation, while the other is an alternating current installation throughout. The present day trend in the art of electrically-propelled ships appear to be toward alternating current systems and alternating current propelled-driving motors. It is quite natural that the induction motor, and in particular an induction motor of the squirrel cage type, should appeal more strongly to marine engineers as the main drive for a ship's propeller than any other type of motor, on account of its robust and simple construction. The screw propeller of a ship, which under the best of conditions has rather low efficiency, can be designed for best efficiency at an exceedingly low speed. The appropriate propeller speed depends upon many circumstances, but for many ships the order of magnitude may be taken as about 75 R. P. M. The design of an induction motor for low speed is tremendously handicapped. In fact, the higher the speed the better will be the design of an induction motor, and even for large motors ten times the propeller speed mentioned would not be too great. The high speed induction motor is not only much cheaper, lighter, and more compact, but it operates with better power factor and efficiency, and greater instantaneous overload capacity.

As thus analyzed it will be seen that it is a good deal of a make-shift to employ an induction motor direct connected to a ship's propeller. One of the important objects of interposing an electric transmission between the turbines and propellers of a ship is to reconcile the high speed necessary for an efficient turbine with the low speed necessary for a propeller, and when an induction motor is used as an intermediary element, some of the advantages of electric transmission are less considerable than could be desired. One way of reconciling the matter would be to drive the propeller from a high speed induction motor by the interposition of mechanical gearing, such as the Alquist gearing. This might be a fairly satisfactory solution of the problem, since the slight losses in the gearing would be offset by the greater efficiency of the motors, while the space and outlay for the gearing would be largely offset by the reduced space occupied by the high speed motors and their lesser weight and cost. However, a squirrel cage induction motor drive can have more than one speed only by the introduction of unsatisfactory and undesirable complications, such as double or complex windings on the stator. In other words, the induction motor is essentially a non-adjustable speed motor.

After a very careful study and consideration of this problem, and of the facts hereinbefore mentioned, I have devised an electrical system of ship propulsion which possesses all of the advantageous features of the two prior systems, before mentioned, without their disadvantages and complications. My invention contemplates the use of direct current motors direct coupled to the propeller shafts. It is not so generally recognized as it should be, notwithstanding the advantages in design which have been obtained by the introduction of interpoles, that the direct current motor is much more satisfactory for operation at low speeds than for operation at high speeds, thus having precisely the converse attributes of those possessed by the induction motor. Moreover, a direct current motor can readily be designed for satisfactory operation over a wide range of speed by the simple and efficient means of varying the excitation of its field. Excepting, therefore, the undesirable attribute of its commutator and brushes, a direct current motor appears ideal for driving a ship's propeller. I ought also to mention the important attribute of the direct current motor of having plenty of starting and reversing torque. In this respect the direct current motor again has an enormous advantage over the induction motor. Furthermore, the use of direct current propeller-driving motors completely eliminates the disadvantages associated with power factors of less than unity. The low speed induction motor has an exceedingly bad power factor, and even the average high speed induction motor is somewhat handicapped in comparison with the direct current motor by having a power factor less than unity.

My present invention contemplates an electrical system of ship propulsion employing large, modern, high-speed turbo-alternator sets, with the great steam economy obtained with them, for delivering electric energy to low-speed direct current motors direct connected to the propeller shafts. For the conversion of the alternating current energy to direct current energy, I propose to use electric current rectifying means, such as iron or steel mercury arc rectifiers of large power. I further propose to drive the ship's auxiliaries, as well as the exciters for the main alternators and blowers for the proper ventilation of the apparatus of the system, by synchronous motors supplied with polyphase currents from the alternators, and, furthermore, to operate these synchronous motors with such excessive excitation that they act as synchronous condensers, and supply, by leading currents in the armature circuits of the alternators, a considerable part of the latter's excitation, thereby cheapening and improving the design of the alternators.

Figure 2:
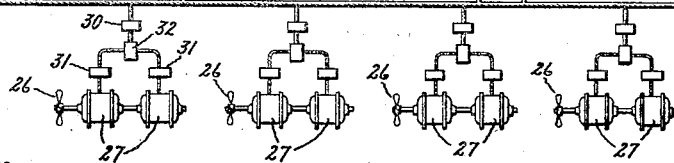
Figure 3:
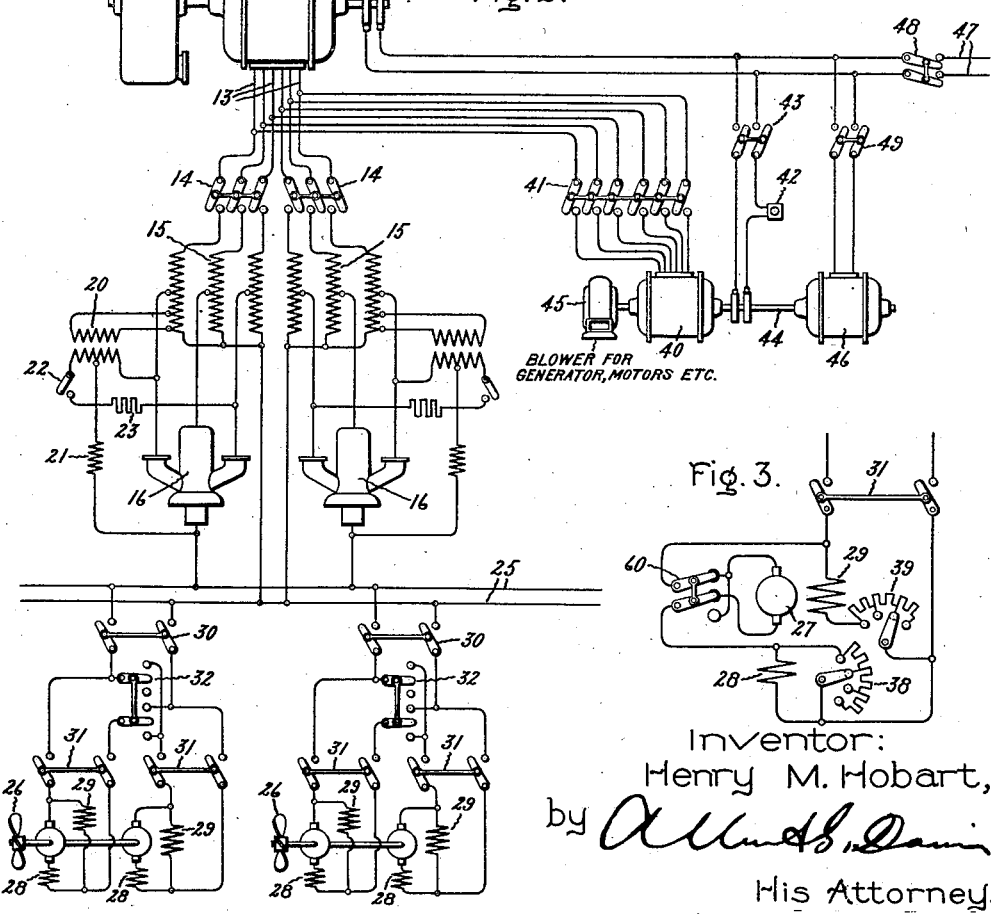

The novel features which I believe to be patentably characteristic of my invention are definitely indicated in the claims appended hereto. The arrangement and mode of operation of an electrical system of ship propulsion embodying my present invention will be understood from the following description taken in connection with the accompanying drawings, in which:

Figure 1 is a diagrammatic view showing the arrangement of apparatus in a system of propulsion embodying my invention; Fig. 2 is a diagrammatic view of one unit of the system; and Fig. 3 is a diagrammatic detail view of the controlling apparatus associated with each propeller-driving motor.

The advantageous features of a system of propulsion embodying my present invention will be best understood by reference to the accompanying drawings. In Fig. 1 of the drawings, an assembly of the apparatus of the propelling system of a ship is diagrammatically represented. The system includes three turbo-generator sets, each comprising an alternator 10 and a steam or other elastic fluid turbine 11. The alternators are of the revolving field type and have stator windings wound for six phases, as indicated by the six conductors 13 in Fig. 2. Three of the conductors 13 of each alternator are connected through a switch 14 and an auto-transformer 15 to a three-phase electric current rectifier 16, while the other three of the conductors 13 are similarly connected through a switch 14 and an auto-transformer 15 to another three-phase rectifier 16. The phase windings of the auto-transformers 15 are connected in star, and the conductors leading to the rectifiers are tapped off the auto-transformers at appropriate points. The rectifiers 16 illustrated in the drawings to explain my invention are of the mercury vapor type known as the high-power iron or steel rectifier. Steel mercury vapor rectifiers of large capacity are small and compact and do not constitute a serious item in the total cost of the installation, nor do they occupy an unreasonable amount of space. Each rectifier is provided with an exciting device comprising a transformer 20 tapped off of one phase winding of its coöperating auto-transformer. The middle point of the secondary winding of the transformer 20 is connected through an inductance 21 to the cathode of the rectifier, while the ends of this secondary winding are connected to two of the anodes of the rectifier. A switch 22 and a resistance 23 are included in the connection between one end of the secondary winding of the transformer 20 and the coöperating anode of the rectifier. The direct current terminals of each rectifier are connected to the main high potential bus bars 25.

The ship has four low-speed propellers 26. Two direct current motors 27 are direct connected to the shaft of each propeller. These motors may be constructed with a relatively small number of poles, for example from 8 to 12 poles, and consequently may be of relatively small diameter and relatively long. Such proportions lead to low first cost, compactness, and efficiency. The motors may be cooled by blowing air through them, more or less similarly to the way now generally used for turbo-alternators, and may further be totally inclosed thus permitting of keeping them dry. This is an important feature in a ship installation, and permits of obtaining a much better design of insulation. By the circulation through the motors of an enormous quantity of dry air, their insulation can be maintained under the worst conditions likely to occur. Each motor has a series field winding 28 and a shunt field winding 29. Rheostats 38 and 39 diagrammatically represent any suitable means for controlling the strengths of the series and shunt fields, respectively.

Main switches 30 serve to connect the two motors of each propeller shaft to the direct current bus bars 25, while each motor is further provided with an independent switch 31. A series-paralleling switch 32 is also provided for the two motors of each propeller. When the switch 32 occupies its upper position, as viewed in Fig. 2, the pairs of motors are arranged to be connected in parallel to the bus bars 25, and either or both of the switches 31 may then be closed. When the switch 32 occupies its lower position, the pairs of motors are arranged in series relation, and both of the switches 31 must then be closed. Each motor is also provided with a suitable reversing switch 60. It will, of course, be understood that the operating switches and the control apparatus in general of my improved system of propulsion is only diagrammatically illustrated in the accompanying drawings, and hence is represented by very elementary forms and described by very elementary terms. In practice, these various individual switches are preferably operated by a suitable controller, and hence in actual practice highly developed controllers and oil switches would be used rather than the elementary control apparatus illustrated in the drawings for the purpose of clearly describing the principle of my invention.

For running the ship at full speed, all eight motors are connected in parallel to the bus bars 25. Lower speeds are obtained by strengthening the fields of the motors, or by throwing the two motors of each pair in series with one another. Since, however, at low speed a ship requires much less power than at full speed, it will generally be preferable to completely cut out one motor of each pair for low speed operations, and run the remaining motors with strong fields. It should be understood, however, that a low speed of the ship is not always accompanied by a low power demand, since when the ship is exceedingly heavily overloaded, or when proceeding in heavy seas or against head winds, low speeds might and frequently would be associated with high power, and under such conditions all of the propeller-driving motors might be required, even though the ship's speed would be low. Thus, where I have herein spoken of operating all of the propeller-driving motors in parallel for running the ship at full and high speeds, and of operating less than all of the motors for running the ship at lower speeds, it will be understood that I typify by full speed and low speed, the high and low power demands, respectively, which under normal navigating conditions are required to produce such speed operations, and, accordingly, it will be understood that high and low powers are not in all cases, although usually, associated with high and low speeds, respectively. When two motors drive the same shaft, they will, when operating in parallel, share the load most satisfactorily when each aramature is independently in series with its own series field winding; that is to say, when there is no equalizing connection. The series winding is thus an important feature of the arrangement, for this additional reason of insuring equal distribution of the load between the two motors driving the same shaft when these are connected in parallel. By having a greater percentage of series field winding and a diverting shunt around it, which is closed around the series field at high speed, low speeds can be obtained by operation with only one motor per propeller and with a predominating series characteristic, while for high speeds both motors are employed and are connected in parallel with weakened series fields. For starting and reversing, both motors are in circuit, and are connected in series with one another and with full strength of series fields.

A synchronous motor 40 is adapted to be connected, by means of a 6-blade switch 41, to each of the polyphase alternators 10. The synchronous motor is so designed that its field can be greatly over-excited without occasioning undue heating. A rheostat 42 is included in the direct current field circuit of the synchronous motor, for adjusting the exciting current of the motor. A switch 43 serves to connect the field circuit of the synchronous motor to a suitable source of direct current energy. The leading current which the synchronous motor will draw from the stator winding of the alternator will provide a considerable part of the excitation required to supply the magnetic flux for the alternator, and will greatly decrease the excitation needed for the rotor of the alternator. Consequently, the rotor of the alternator and its exciting winding are designed to be smaller than would be practicable were the entire magnetomotive force provided by it.

The synchronous motor drives a shaft 44 to which is direct coupled a blower 45 for circulating cooling air through the alternator, motors, auto-transformers, and about the parts of the rectifiers. An exciter 46 is also direct coupled to the shaft 44. The synchronous motor may also be employed to drive the air pump for maintaining the vacuum in the steel mercury vapor rectifiers, as well as the usual auxiliaries of the ship. The ship has the usual constant potential direct current mains 47, which may initially derive energy from any suitable direct current source, such as storage batteries or an auxiliary generating set, not shown. Switches 48 are provided for connecting the fields of the alternators to the mains 47. Switches 49 are also provided for connecting the exciters 46 to the field circuits of the alternators 10. When the alternators are generating voltage, the exciters 46 will be driven by the synchronous motors 40 and may be employed to deliver energy to the mains 47 by closing the switches 48 and 49.

In order to emphasize the extent to which the advantageous attributes of the various components of my improved system of propulsion fit into one another, I will mention, merely by way of example, a certain representative equipment embodying my invention and adapted for a ship of considerable size. I have already mentioned a propeller speed of 75 R. P. M., and I will now assume that this is the desired full speed of the propeller. The direct current motors are preferably designed for high voltage, for example 1500 volts, and each has a capacity of about 3000 KW, and are provided with about 15 per cent. series winding. Such motors have a full load current of about 2000 amperes, and an excellent design can be made with a relatively small number of poles. Each of the generators 10 has a capacity of about 9000 KW, and may run at a constant speed of at least 2000 R. P. M. I have mentioned 1500 volts for the pressure of the motors. The higher the direct current voltage the less will be the commutator losses of the motors, and the greater will be the efficiency of the rectifiers. For 1500 volts, the efficiency of the rectifiers (exclusive of their auxiliaries) would be over 98 per cent. Thus, the losses in the rectifiers will be immaterial, and will be more than offset by the greater efficiency of the propeller-driving motors, as compared with low-speed induction motors. The high voltage of the propeller-driving direct current motors is thus an important feature of my improved system, since it permits of using motors with small commutator losses, and enables the use of very efficient rectifying apparatus and the use of motors of especially appropriate characteristics for ship propulsion, such as readily variable speed, high starting and reversing torque, and good properties at the speeds of efficient propellers.

I should like to emphasize that my improved system of ship propulsion does not consist of a lot of apparatus thrown thoughtlessly together, but that it is a carefully devised combination, with each part deliberately arranged to be of a type most appropriate for the functions which it performs, with the idea of obtaining a system combining reasonable first cost with good operating economy. The system combines the advantageous features of an entire direct current equipment and an entire alternating current equipment, without the objectionable features of such equipments. Every component in my present system of propulsion has been chosen not only with a particular view to its own operating characteristics, but with a view to its characteristics when operating in combination with the other components of the system.

What I claim as new and desire to secure by Letters Patent of the United States, is:—

1. An electrical system of ship propulsion comprising in combination an elastic fluid turbine, a polyphase alternator coupled to said turbine, electric current rectifying means electrically connected to said alternator and adapted to convert the alternating current energy generated by said alternator to high potential direct current energy, a plurality of propellers, a direct current electric motor directly coupled to each of said propellers and supplied with said high potential direct current energy, and means for varying the speed of the ship by varying the field strengths of said motors.

2. An electrical system of ship propulsion comprising in combination a plurality of elastic fluid turbines, a polyphase alternator coupled to each turbine, electric current rectifying means connected to each alternator and adapted to convert the alternating current energy generated by the alternators to direct current energy, a plurality of propellers, a plurality of direct current electric motors directly coupled to each propeller, each of said motors having a shunt and a series field winding, means for supplying said direct current energy to all of said motors in parallel for running the ship at full speed and to less than all of the motors of each propeller for running the ship at a lower speed, and means for varying the speed of the ship by varying the field strengths of said motors.

3. An electrical system of ship propulsion comprising in combination an elastic fluid turbine, a polyphase alternator coupled to said turbine, electric current rectifying means connected to said alternator and adapted to convert the alternating current energy generated by the alternator to high potential direct current energy, a propeller, a plurality of direct current electric motors directly coupled to said propeller, and means for supplying said high potential direct current energy to all of said motors in parallel for running the ship at full speed and to less than all of said motors for running the ship at a lower speed.

4. An electrical system of ship propulsion comprising in combination a plurality of elastic fluid turbines, a polyphase alternator directly coupled to each of said turbines, high potential direct current bus bars, electric current rectifying means adapted to convert the alternating current energy generated by the alternators to high potential direct current energy for feeding said bus bars, a plurality of propellers, a plurality of direct current electric motors directly coupled to said propellers, means for connecting all of said motors in parallel to said bus bars for running the ship at full speed and for connecting less than all of the motors of each propeller to said bus bars for running the ship at a lower speed, and means for varying the speed of the ship by varying the field strengths of the operating propeller-driving motors.

In witness whereof, I have hereunto set my hand this 30th day of August, 1915.

HENRY M. HOBART.

---

Corrections in Letters Patent No. 1,262,497.

It is hereby certified that in Letters Patent No. 1,262,497, granted April 9, 1918, upon the application of Henry M. Hobart, of Schenectady, New York, for an improvement in "Electrical Systems of Ship Propulsion," errors appear in the printed specification requiring correction as follows: Page 1, line 56, for the word "appear" read *appears;* same page, line 58, for the compound word "propelled-driving" read *propeller-driving;* and that the said Letters Patent should be read with these corrections therein that the same may conform to the record of the case in the Patent Office.

Signed and sealed this 14th day of May, A. D., 1918.

[SEAL.]
R. F. WHITEHEAD,
*Acting Commissioner of Patents.*

Cl. 172—8.